United States Patent [19]

Arethens et al.

[11] Patent Number: 5,063,777
[45] Date of Patent: Nov. 12, 1991

[54] METHOD AND DEVICE FOR DETERMINING THE SPEED OF A HELICOPTER WITH RESPECT TO THE AIR

[75] Inventors: J. P. Arethens; P. Goumier-Beraud, both of Valence, France

[73] Assignee: Sextant Avionique, France

[21] Appl. No.: 532,331

[22] Filed: Jun. 5, 1990

[30] Foreign Application Priority Data

Jun. 7, 1989 [FR] France ................. 89 07514

[51] Int. Cl.⁵ ............................. G01C 21/10
[52] U.S. Cl. ........................ 73/178 H; 73/181; 364/424.06; 364/922.8
[58] Field of Search .............. 73/178 H, 181; 364/922.8, 566, 424.06, 434, 435; 244/17.13

[56] References Cited

U.S. PATENT DOCUMENTS

| | | | |
|---|---|---|---|
| 4,702,106 | 10/1987 | Hassenpflug et al. | 73/181 |
| 4,766,767 | 8/1988 | Hassenpflug et al. | 73/178 H |
| 4,794,793 | 1/1989 | Favre et al. | 73/181 |

FOREIGN PATENT DOCUMENTS 0283626  5/1987  European Pat. Off.
0249848  6/1987  European Pat. Off.
0280599  2/1988  European Pat. Off.
2613078  3/1987  France.

Primary Examiner—Donald O. Woodiel
Attorney, Agent, or Firm—Lowe, Price, LeBlanc and Becker

[57] ABSTRACT

A method and device are disclosed for determining the airspeed of a helicoper, in which, for a plurality of flight configurations of a calibration flight, magnitudes for estimating the airspeed and the collective $P_O$ and cyclic pitches $P_X$ and $P_Y$ of the lift rotor, the pitch $P_Z$ of the antitorque rotor, the angles of bank $\theta_X$ and $\theta_Y$ and the acceleration $\gamma_Z$ are measured. Correlation matrices between the speed estimated with respect to the air and variables related to the pitches, angles and acceleration measured during the calibration flight are then formed. Formulae are derived, for calculating the estimated speed, by a stepwise regression algorithm, which are used in normal flight for calculating, in response to the pitches, angles and acceleration measured during normal flight, the speed with respect to the air, if required after correction of the values of the multiplicative coefficients of these calculation formulae.

13 Claims, 2 Drawing Sheets

METHOD AND DEVICE FOR DETERMINING THE SPEED OF A HELICOPTER WITH RESPECT TO THE AIR

BACKGROUND OF THE INVENTION

The present invention relates first of all to a method for determining the speed of a helicopter with respect to the air for piloting same, which helicopter has a longitudinal axis OX, a transverse axis OY and a vertical axis OZ, with a lift rotor whose collective pitch $P_O$, longitudinal cyclic pitch $P_X$ and transverse cyclic pitch $P_Y$ are controllable, as well as an anti-torque rotor whose pitch $P_Z$ is controllable, in which method the two components $V_X$ and $V_Y$ of this speed along the two axes OX, OY are determined, respectively, as a function of the controlled values of said pitches $P_O$, $P_X$, $P_Y$ and $P_Z$, of the angles of bank $\theta_X$, $\theta_Y$ of the helicopter about axes OY and OX respectively, and of the acceleration value $\gamma_z$ of the helicopter along axis OZ.

The speed thus determined is displayed on the instrument panel of the helicopter, for use by the pilot. In fact, the speed of the helicopter with respect to the air, often called air-speed, is the proper speed of the helicopter with respect to the mass of air in which it moves. In the absence of wind, the air speed is the same as the ground speed. In the presence of wind, the ground speed is equal to the sum of the air speed and the wind speed. The air speed is important for safety reasons, for it is it which, in flight, conditions the balance of the helicopter. It is therefore of prime importance for the pilot to know the air speed at all times with the greatest possible accuracy.

Anemometers exist for measuring this speed. However, conventional anemometers, which are based on measuring the pressure by means of a Pitot tube, for example, only give valid results if the speed is greater than a certain threshold, currently about 45 knots, for example. Laser anemometers do not suffer from this disadvantage, but they are of a cost price and weight which make their use difficult on board a helicopter. This is why a method of the above defined type, which does not require for its use a heavy and specific apparatus on board, since it uses magnitudes normally available on board a helicopter, is appreciable.

A method of the above type is already known, from the French application no. 2 613 078, in the name of the Applicant. This method is based on theoretic modelling of the operation of the helicopter, which modelling allows formulae to be drawn up which relate the components $V_X$ and $V_Y$ of the speed, to the pitches $P_O$, $P_X$, $P_Y$ and $P_Z$, to the angles of bank $\theta_X$, $\theta_Y$ and to the acceleration $\gamma_Z$. However, since the values of some of the parameters appearing in these formulae are difficult to obtain, for each practical case, at least one calibration flight is made for experimentally determining the values of the coefficients which appear in the theoretical formulae. For this, the helicopter passes through a certain number of different flight configurations, for which means are provided for estimating the air speed, by means of direct or indirect measurements, and for which $P_O$, $P_X$, $P_Y$, $P_Z$, $\gamma_x$, $\theta_y$ and $\gamma_z$ are measured. By identifying the value of the estimated speed and that given by the theoretical calculation formula for each flight configuration, a system of equations is obtained whose unknowns are the coefficients it is desired to determine. This system is solved by the method of least squares, for example. Thus, in the known method, the form or structure of the formulae which make calculation of the air speed possible are established theoretically, whereas the values of the coefficients which appear in these formulae are determined experimentally.

However, although this known method in some cases gives satisfactory results, this is not always so, probably because the theoretical model of the operation which serves as basis, despite its complexity, does not correspond to reality. It would doubtless be possible to perfect this theoretical model for a well defined type of helicopter but in this case, the calculations made for this type of helicopter would not be valid for another type of helicopter, which makes the known method long and expensive.

The purpose of the present invention is to overcome these drawbacks by providing a method which, whatever the type of helicopter, gives results which are always precise, without it being necessary to make a different theoretical model for each different type of helicopter.

SUMMARY OF THE INVENTION

For this, the present invention provides a method of the above type, characterized by the fact that:

during a first step, a calibration flight is made, causing the helicopter to pass through a plurality of N different flight configurations, for each of which both a plurality of magnitudes for estimating the speeds $V_X$ and $V_y$ and the value of the pitches $P_O$, $P_X$, $P_Y$ and $P_Z$, of the angles $\theta_X$, $\theta_Y$ and of the acceleration $\gamma_Z$ are measured, during a second step, said speeds $V_X$ and $V_Y$ are estimated for each flight configuration, a first matrix is calculated of the correlation coefficients of all the possible pairs of variables of a first set of variables comprising the estimated speed $\hat{V}_X$ and variables constructed from the pitches $P_O$, $P_X$, $P_Y$ and $P_Z$, from angles $\theta_X$, $\theta_Y$ and from the acceleration $\gamma_Z$, and a second matrix is calculated comparably with the first one but relative to a second set of variables comprising the estimated speed $\hat{V}_Y$ and said constructed variables, during a third step, using said first matrix, the constructed variable of the first set the most correlated with the estimated speed $\hat{V}_X$ is determined, from this estimated speed $\hat{V}_X$ is subtracted said most correlated constructed variable multiplied by a multiplicative coefficient chosen so that the estimated speed thus modified is totally decorrelated from the most correlated constructed variable, the error committed is calculated by admitting that the modified value is zero, a first modified matrix is calculated like said first matrix was calculated but replacing the estimated speed $\hat{V}_X$ by the modified estimated speed, and the operation is repeated until a number $n_x$ of constructed variables of the first set have been subtracted from the estimated speed $\hat{V}_X$, sufficient so that the error committed, assuming that the modified value is zero, is less than a threshold, so as to obtain, for the value of the estimated speed $V_X$, a calculation formula as a function of the $n_x$ constructed variables of the first set, and the procedure is the same for the second matrix, so as to obtain a similar formula for $\hat{V}_Y$ as a function of $n_y$ constructed variables of the second set, and during a fourth step, in normal flight, the values of the pitches $P_O$, $P_X$, $P_Y$ and $P_Z$, of the angles $\theta_x$, $\theta_y$ and of the acceleration $\gamma_Z$ are measured, the speeds $V_X$ and $V_Y$ are calculated by applying the formulae defined during the third step and in response to the values measured during the fourth step, and the calculated values $V_X$ and $V_Y$ are displayed for use by the pilot of the helicopter.

In the method of the present invention, the formulae for calculating $V_X$ and $V_Y$ in normal flight are found experimentally, taking into account the variables which are the most correlated to the estimated speeds $\hat{V}_X$ and $\hat{V}_Y$ over the whole of the flight configurations of the calibration flight. The result is that, whatever the type and special features of the helicopter for which the method is applied, the formulae for calculating $V_X$ and $V_Y$ are closely related to reality without it being necessary to change anything in the method. This remarkable result is attained by the Applicant particularly for, during the third step and independently, he applies to each of the correlation coefficient matrices, an algorithm which is no other than the algorithm known under the name of stepwise regression. Surprisingly, the results obtained are very satisfactory, whereas the variables considered are not independent. Furthermore, with the method of the invention, the formulae for calculating $V_X$ and $V_Y$ do not risk being uselessly complex, since only the variables the most correlated with the components $V_X$ and $V_Y$ are taken into account. This characteristic makes it possible, in normal flight, to have a calculating time reduced to what is just necessary. Advantageously, the variables constructed during the second step from pitches $P_O$, $P_X$, $P_Y$ and $P_Z$, angles $\theta_x$, $\theta_y$ and acceleration $\gamma_z$ comprise:

simple variables of the first order, namely $P_O$, $P_X$, $P_Y$ $P_Z$ and $\gamma_Z$, combined variables of the first order namely $P_X - \theta_X$ and $P_Y - \theta_Y$ and simple variables of the second order, namely the squares and the two by two products of the variables $P_O$, $P_X$, $P_Y$, $P_Z$, $\theta_X$, $\theta_Y$ and $\gamma_Z$.

In this case, experience shows that the error does not vary significantly beyond a number $n_X$ or $n_Y$ of variables equal to 15, and sometimes well before this value is reached. The choice of combined variables $P_X - \theta_X$ and $P_Y - \theta_Y$ is justified because the theoretical models, as well as experience, shows that this term is preponderant. It is therefore advantageous, from the point of view of the time taken for the calculations effected during the third step, to provide it from the variables constructed from $P_O$, $P_X$, $P_Y$, $P_Z$, $\theta_X$, $\theta_Y$ and $\gamma_Z$.

Again advantageously, at the end of the third step, the $n_x$ and $n_y$ multiplicative coefficients of the formulae for calculating $V_X$ and $V_Y$, respectively, are considered as unknowns, the results of the measurements made during the first step are brought forward to these formulae, so as to form at least one system of linear equations in which the $n_x$ and $n_y$ multiplicative coefficients are the unknowns, this system is solved and, in the formula for calculating $V_X$ and $V_Y$, the values of the $n_x$ and $n_y$ multiplicative coefficient, respectively, are corrected by replacing them by those thus defined.

In this case, application of the stepwise regression algorithm to the correlation coefficient matrices or correlation matrix, serves solely for determining the structure of the formulae, the numerical values of the coefficients used in these formulae being defined by resolution of a system of equations obtained by transferring into these formulae the results of the measurements made during the calibration flight. This in general improves the accuracy relative to the values of the coefficients used in the formulae. In addition, when for example a sensor has to be changed on a helicopter whose calculation formulae were known, a new calibration of these formulae can be made without having to pass again through the step of the correlation matrices and the stepwise regression. In fact, when a sensor on a helicopter is changed, there is no reason for the structure of the formulae for calculating $V_X$ and $V_Y$ to be affected, and only the numerical value of the coefficients which appear in these calculations risks being changed. In such a case, it is sufficient to calibrate as indicated above without repeating the procedure for determining the structure of the formulae.

In a first embodiment of the method of the invention, first and second linear equation systems are formed by identifying, for a plurality of flight configurations taken from the N flight configurations, the estimated speed $\hat{V}_X$ or $\hat{V}_Y$ obtained during the second step, with the quantity obtained by the corresponding calculation formula.

This first embodiment is fairly simple, but as will be better understood hereafter, requires estimated values $\hat{V}_X$ and $\hat{V}_Y$ fairly close to reality. Such may be the case if, during the calibration flight, a laser anemometer was carried on board for measuring the air speed directly, for example.

In a second embodiment of the method of the invention, during the first step, the ground speed is measured as well as the attitude angles of the helicopter for each of the flight configurations and the time of dating same, and, for forming the system of linear equations, from the flight configurations pairs of flight configurations are chosen having dating times sufficiently close to assume that the wind is the same in these two flight configurations, the result of the measurement of the ground speed and the formula for calculating the components of the air speed are transposed in the Earth's reference frame and for each flight configuration, and as equation to be solved those are taken which are obtained by identifying the measured variation of the ground speed of the helicopter between the two oonfigurations of a pair, and the variation calculated by means of the formulae for calculating the air speed of the helicopter.

Using this method, for calculating the components of the calculation formulae, only the ground speed and attitude measurements are used, which were made during the calibration flight, the result of which measurements is known with good accuracy.

In a third embodiment of the invention, during the first step the ground speed and the attitude angles of the helicopter are measured for each of the flight configurations, as well as the time of dating same and, to form the system of linear equations, it is assumed that the wind, in the Earth's reference frame, follows a polynomial law as a function of time of unknown coefficients, the wind speed is transposed into the helicopter reference frame for each flight configuration, and, for a plurality of flight configurations taken from the N flight configurations, the result of the measurement of the ground speed is identified with the sum of the wind speed and the air speed obtained by the formulae for calculating $V_X$ and $V_Y$, so as to define at the same time the $n_x$ and $n_y$ multiplicative coefficients and the unknown coefficients of the polynomial law of the wind.

In this case, the calculating time is a little longer, for the system comprises more unknowns, but the accuracy of the result is increased.

Again advantageously, during the first step, the N different flight configurations are determined so that a minimum number of them belongs to each of the sub-ranges of the range of possible configurations of the helicopter in normal flight, each sub-range being defined for example by ranges of values of the magnitudes measured for each flight configuration.

Thus a good distribution of the flight configurations is obtained for which the measurements are made, so that the correlation matrices are indeed representative of the set of phenomena likely to occur during normal flight.

Again advantageously, during the first step, the ground speed and the attitude angles of the helicopter are measured as well as the modulus of the air speed of the helicopter, it is assumed that the mean wind in the Earth's reference frame has remained constant during the calibration flight, a plurality of equations is formed, each equation identifying, for a flight configuration in the Earth's reference frame, the measured modulus of the air speed and the calculated modulus of the difference between the ground speed and the wind speed, these equations are subtracted term by term and two by two, the system of equations thus formed is solved for correlating the mean wind speed during the calibration flight and, during the second step, the mean wind speed thus calculated is transposed in the helicopter's reference frame so as to estimate the air speed as the sum of the ground speed and the mean wind speed.

In this case, it is not necessary to carry a laser anemometer on board, for example, during the calibration flight. In fact, with the above method, it is possible to estimate the components $V_X$ and $V_Y$ of the air speed during the calibration flight from the knowledge alone of the modulus of this speed, of the three components of the ground speed and of the attitude angles during this flight. Now, the modulus of the air speed can be measured, at least when it is greater than a certain threshold, by the anemobarometric sensor normally provided on the helicopter, and the ground speed components, the attitude and the heading are magnitudes normally available on board a helicopter. The above method is based on the assumption that the wind, measured in the Earth's reference frame, remains the same during the whole of the calibration flight. The components of the mean wind are then calculated from the set of flight configurations for which a valid measurement of the modulus of the air speed is available. Then, to estimate the components of the air speed in each flight configuration, the components of the ground speed measured in this configuration are used and that of the mean wind determined as above.

Again advantageously, during the fourth step in normal flight, the air speed of the helicopter is measured using anemobarometric means, and in response to the value of the anemobarometric speed thus measured, as value of the air speed is selected the result of the measurement, that of the calculation by the calculation formulae determined during the third step, or a combination of both.

In this case, the results of the anemobarometric measurement are used when they are available, namely when the air speed is sufficiently high, for example.

The present invention also provides a device for implementing the method of the invention, characterized by the fact that it comprises:

means for measuring, during a first step during which a calibration flight is made causing the helicopter to pass through a plurality of N different flight configurations, both a plurality of magnitudes for estimating the speeds $V_X$ and $V_y$, and the values of the pitches $P_O$, $P_X$, $P_Y$ and $P_Z$, angles $\theta_X$, $\theta_Y$ and acceleration $\gamma_Z$;

means for estimating, during a second step, said speeds $V_X$ and $V_Y$ for each flight configuration, for calculating a first matrix of the correlation coefficients of all the possible pairs of variables of a first set of variables comprising the estimated speed $\hat{V}_X$ and variables constructed from pitches $P_O$, $P_X$, $P_Y$ and $P_Z$, angles $\theta_x$, $\theta_y$ and acceleration $\gamma_Z$, and for calculating a second matrix comparably to the first but relative to a second set of variables comprising the estimated speed $\hat{V}_Y$ and said constructed variables, means for determining, during a third step, and using said first matrix, the constructed variable of the first set the most correlated with the estimated speed $\hat{V}_X$, for subtracting from this estimated speed $\hat{V}_X$ said most correlated constructed variable multiplied by a multiplicative coefficient chosen so that the estimated speed thus modified is totally decorrelated from said most correlated constructed variable, for calculating the error committed while assuming that the modified value is zero, for calculating a first modified matrix as said first matrix was calculated but replacing the estimated speed $\hat{V}_X$ by the modified estimated speed, and repeating the operation until a number $n_x$ of constructed variables of the first set are subtracted from the estimated speed $\hat{V}_X$ which are sufficient for the committed error, assuming that the modified value is zero, is less than a threshold, so as to obtain a calculation formula for the value of the estimated speed $\hat{V}_X$, as a function of the $n_x$ constructed variables of the first set, and to carry out a similar procedure for the second matrix so as to obtain a similar formula for $\hat{V}_Y$, as a function of $n_y$ constructed variables of the second set, and means for measuring, during a fourth step, in normal flight, values of the pitches $P_O$, $P_X$, $P_Y$, $P_Z$, angles $\theta_X$, $\theta_Y$ and the acceleration $\gamma_Z$, means for calculating the speeds $V_X$ and $V_Y$ by means of the formulae defined during the third step and in response to the values measured during the fourth step, and means for displaying the calculated values $V_X$ and $V_Y$ for use by the pilot of the helicopter.

BRIEF DESCRIPTION OF THE DRAWINGS

The present invention will be better understood from the following description of a preferred embodiment of the method of the invention, and the preferred embodiment of the device of the invention and some variants, with reference to the accompanying drawings in which.

DESCRIPTION OF THE PREFERRED EMBODIMENTS

Figure 1:
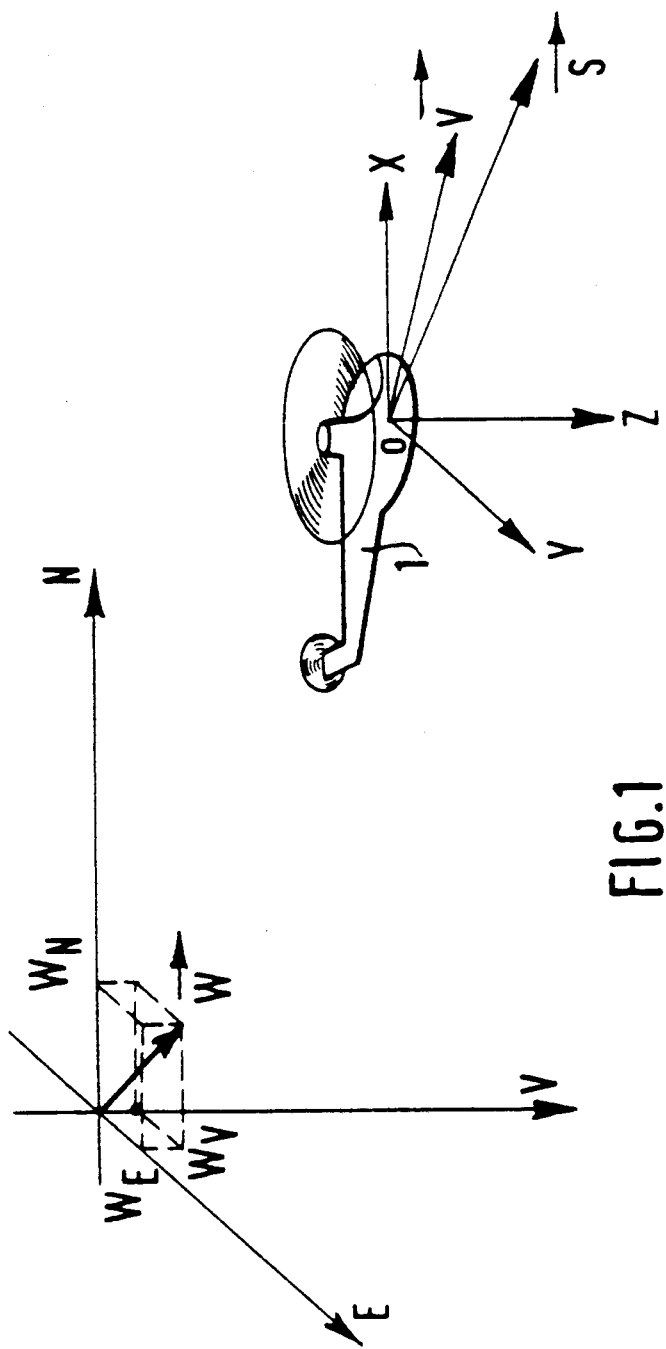
FIG. 1 shows schematically a helicopter during flight.

Referring to FIG. 1, a helicopter 1 is shown during flight.

Helicopter 1 is driven, with respect to the mass of air in which it moves, at a proper speed, or air speed, represented by a vector $\vec{V}$. It is driven, with respect to the ground at a speed represented by a vector $\vec{S}$, which is here different from its own speed $\vec{V}$ because of the existence of wind which drives the mass of air in which the helicopter moves at a speed, with respect to the ground, represented by a wind vector $\vec{W}$.

The method and device of the invention make it possible to determine, on board helicopter 1 and from information delivered by its on board instruments, its own speed, or air speed $\bar{V}$.

In a way known per se, a reference frame OXYZ is related to helicopter 1, axis OX being a longitudinal axis directed towards the front of helicopter 1, axis OY being a transverse axis directed to the right of its pilot, and axis OZ an axis directed downwards, here merging with the axis of the hub of its rotor.

Similarly, the Earth's reference frame here comprises an axis N directed towards the North, an axis E directed towards the East and an axis V directed vertically downwards.

In this case, we are interested essentially in the two components of the air speed along axes OX and OY, referenced $V_X$ and $V_Y$ respectively.

As is known, helicopter 1 comprises a lift rotor with blades whose collective pitch $P_O$, longitudinal cyclic pitch $P_X$ and transverse cyclic pitch $P_Y$ are controllable. The pitch or blade angle of a blade is the angle which the zero lift chord of its profile forms with the rotational plane of the blades. The collective pitch $P_O$ represents the mean blade angle of the set of blades, it being understood that, during each revolution of the rotor, the instantaneous angle of each blade may be caused to vary cyclically about its mean value, the cyclic pitches $P_X$ and $P_Y$ correspond to the cyclic variations of the blade angle. The pitches $P_O$, $P_X$, $P_Y$ are controlled by the pilot of the helicopter who adjusts the position and orientation of a cyclic plate which itself controls the pitch of each of the blades. Action on the collective pitch $P_O$ simply causes the helicopter to go up or down, whereas action on the cyclic pitches $P_X$, $P_Y$ causes the rotor disk to tilt, i.e. the disk described by the blades and causes movement of the helicopter in the horizontal plane.

Furthermore, the helicopter is provided with an anti-torque rotor, whose pitch $P_Z$ is controlled by the pilot of the helicopter.

It is known, particularly from the French application 2 613 078 to determine the components $V_X$ and $V_Y$ of the air speed using calculation formulae which express them as a function of the values of the pitches $P_O$, $P_X$, $P_Y$ and $P_Z$ controlled by the pilot, from the values of the angles of bank $\theta_X$, $\theta_Y$ of the helicopter 1 about axes OY and OX respectively, as well as from the value of the acceleration $\gamma_Z$ of the helicopter 1 along axis OZ. To the extent that the values of $P_O$, $P_X$, $P_Y$ and $P_Z$, $\theta_x$, $\theta_y$ and $\gamma_Z$ are readily available on board the helicopter, at the output of appropriate displacement sensors, inclinometers, accelerometers, such a method is easy to use.

Like the known method, the method of the invention involves drawing up formulae for calculating $V_X$ and $V_Y$ from the knowledge of $P_O$, $P_X$, $P_Y$ and $P_Z$, $\theta_x$, $\theta_y$ and $\gamma_Z$. Nevertheless, it differs from this known method by the fact that it involves forming the structure of these formulae not from a theoretical model of the operation of the helicopter, but from experimental data collected during the calibration flight, as will now be described.

The method of the invention begins then by a first step during which a calibration flight is carried out. During this flight, the helicopter passes through a plurality of N different flight configurations. For each them, the values of $P_O$, $P_X$, $P_Y$ and $P_Z$, $\theta_x$, $\theta_y$ and $\gamma_Z$ are measured as well as a plurality of magnitudes for estimating the components $V_X$ and $V_Y$ of the air speed.

In the case where a laser anemometer is carried on board during the calibration flight, this plurality of magnitudes comprises simply the values of the components $V_X$ and $V_Y$ delivered directly by the laser anemometer. However, considering the cost and weight of such a laser anemometer, it is rarely so. In this case, the method of the invention involves measuring, for subsequently estimating the speeds $V_X$ and $V_Y$, the following magnitudes:

the three components $S_X$, $S_Y$ and $S_Z$ of the ground speed $\bar{S}$ in the reference frame OXYZ, the three attitude angles of the helicopter 1, namely the heading angle $\psi$, yaw angle $\theta$ and roll angle $\phi$, and the modulus $V$ of the air speed $\bar{V}$.

It will be noted here that these magnitudes are normally available on board the helicopter 1, components $S_X$, $S_Y$ and $S_Z$ at the output of a ground speed measurement device, angles $\psi$, $\theta$, and $\phi$ and at the output of the attitude measurement unit and modulus $V$ at the output of a known type anemobarometric sensor, comprising for example a Pitot tube. However, as has already been mentioned, the result of the measurement made by the anemobarometric sensor is only valid if modulus $V$ is greater than a given threshold $V_S$, equal for example to 45 knots.

Before explaining how, during the second step of the method of the invention, the components $V_X$ and $V_Y$ are estimated from $S_X$, $S_Y$ and $S_Z$, $\psi$, $\theta$, and $\phi$ and $V$, the criteria for choosing the flight configurations for which, during the first step, the measurements are made, will now be described.

These criteria of choice comply with two principles:

the flight configurations chosen must represent stable balance configurations of helicopter 1, the distribution of the flight configurations chosen must be representative of the set of conditions of use of the helicopter in normal flight.

Consequently, out of the total number of flight configurations which might be chosen during a calibration flight, only a certain number are.

The total number of configurations which could be chosen is related to the measuring rate of the different sensors and apparatus which deliver the measured magnitudes. In the case described, these sensors and apparatus are controlled so that, every 250 ms, a new set of parameters $P_O$, $P_X$, $P_Y$ and $P_Z$, $\theta_X$, $\theta_Y$, $\gamma_Z$, $S_X$, $S_Y$ and $S_Z$, $\psi$, $\theta$, and $\psi$ and $V$ are available.

Each available set of parameters is therefore stored provisionally and will only be stored finally if it satisfies a number of criteria.

Thus the drifts with respect to time of the expressions $P_X - \theta_X$ and $P_Y - \theta_Y$ are calculated permanently, and any parameter set available at a time when one of these drifts is greater than a threshold which is proper thereto is not chosen. In fact, it is known that in a first approximation the speeds $V_X$ and $V_Y$ are proportional to the expressions $P_X - \theta_X$ and $P_Y - \theta_Y$ respectively. Thus, flight configurations are not chosen which are relative to high acceleration and transitory condition phases, which would lead to poor results.

In addition, in order to eliminate unstable flight configurations, only those are chosen for which a given number of stable successive parameter sets has been chosen which number is for example equal to four. For this, the mean value of each of the parameters out of the four successive sets is calculated, as well as the typical deviation of this parameter, which is compared with a threshold proper to this parameter. If the typical deviations of all the parameters are less than their respective thresholds, then a flight configuration is selected. In this configuration, the selected value for each parameter is the mean value calculated over the four successive sets.

Finally, in order to have good distribution of the selected flight configurations throughout the whole range of possible configurations of helicopter 1 in normal flight, this range is divided into a number of sub-ranges, and, in each of these sub-ranges, a number of selected flight configurations is ensured, this number being comprised between a maximum value and a minimum value.

Here, and by way of example, the sub-ranges are 12 in number and they are defined as follows.

First of all, eight sub-ranges, numbered from 1 to 8, correspond to low air speeds, namely whose modulus V is less than threshold $V_S$ short of which measurement of this modulus by the anemobarometric sensor is incorrect. The sub-ranges 1 to 8 correspond to the following criteria, the speeds being expressed in knots:

sub range 1, or climbing:

$$S_Z < -2.5$$

sub range 2, or descent:

$$2.5 < S_Z$$

sub range 3, or stationary:

$$-10 < S_X < +30$$
$$-7.5 < S_Y < +7.5$$
$$-2.5 < S_Z < +2.5$$

sub range 4, or hybridation:

$$30 < S_X < 60$$
$$-7.5 < S_Y < +7.5$$
$$-2.5 < S_Z < +2.5$$

sub range 5, or lateral left $$0 < S_X$$
$$S_Y < -7.5$$
$$-2.5 < S_Z < +2.5$$

sub range 6, or lateral right $$0 < S_X$$
$$+7.5 < S_Y$$
$$-2.5 < S_Z < +2.5$$

sub range 7, or rear:

$$S_X < -10$$
$$-2.5 < S_Z < +2.5$$

sub range 8, or turn:

$$20°/s < d\psi/dt$$
$$-2.5 < S_Z < 2.5$$

Then four sub-ranges, numbered from 9 to 12, corresponding to high air speeds, i.e. whose modulus V is greater than the threshold $V_S$ beyond which the measurement of this modulus by the anemobarometric sensor is valid. The sub-ranges 9 to 12 correspond to the following criteria:

sub range 9, or level flight $$-2.5 < S_Z < +2.5$$

sub range 10, or climbing:

$$S_Z < -2.5$$

sub range 11, or descent:

$$+2.5 < S_Z$$

sub range 12, or turn:

$$20°/s < d\psi/dt$$
$$-2.5 < S_Z < +2.5$$

When a flight configuration has been selected which does not belong to too high an acceleration phase and is sufficiently stable, it is determined in which sub-range it is likely to be classed, by testing the values of the parameters V, $S_X$, $S_Y$ and $S_Z$ as well as the value of the drift with respect to time of the heading angle $\psi$, for this flight configuration.

When the sub-range in which the configuration to be classed is likely to be classed has been determined, it is ascertained whether the maximum number of configurations classed in this sub-range is reached. If such is the case, the sub-range is full and the configuration to be classed is rejected.

If the sub-range is not full, the difference between the configuration to be classed and each of the configurations already classed is calculated. If this difference is greater than a threshold for each configuration already classed, then the configuration to be classed is effectively classed in its sub-range. The difference calculated here is the square of the differences between the two values of the component $S_X$ and the two values of the component $S_Y$.

Classification comprises essentially storing the parameters $P_O$, $P_X$, $P_Y$, $P_Z$, $\theta_X$, $\theta_Y$, $\gamma_Z$, $S_X$, $S_Y$, $S_Z$, V, $\psi$, $\theta$ and $\phi$ as well as data for dating the flight configuration. As dating data, here the classification rank of the configuration and the time interval which separates it from the configuration of preceding rank is chosen, whether this configuration is classed in the same sub-range or not. Thus, the chronology of classification can be re-established if required, and the instant known at which the data relative to any classed flight configuration was measured.

During the calibration flight, the pilot controls the helicopter 1 so as to allow classification of a sufficient number of flight points in each sub-range to be made. He is advised as soon as a point is classed in a sub-range, and he is informed about the state of filling the different sub-ranges. As soon as the minimum number of points is reached in each of the sub-ranges 1 to 12, the calibration flight is terminated.

The second step of the process may then begin. This is carried out in delayed time, after the first step for acquiring the values $P_O$, $P_X$, $P_Y$, $P_Z$, $\theta_X$, $\theta_Y$, $\gamma_Z$, $S_X$, $S_Y$, $S_Z$, V, $\psi$, $\theta$ and $\phi$ for the N flight configurations evenly distributed in the range of possible configurations for helicopter 1.

The first task carried out during the second step concerns the estimation of the components $V_X$ and $V_Y$ of the air speed for each of the classed flight configurations, from the knowledge of the values of $S_X$, $S_Y$, $S_Z$, $V$, $\psi$, $\theta$ and $\phi$ alone for this configuration. This estimation is here based on the assumption that the wind, expressed in the Earth's reference frame, has remained constant during the calibration flight. The components $W_N$, $W_E$ and $W_V$ of this wind, expressed in the Earth's reference frame, are then determined. Knowledge of the wind speed $\overline{W}$ thus determined and of the ground speed $\overline{S}$ measured for each flight configuration makes it possible to estimate the ground speed $\overline{V}$ for each flight configuration, taking into account the known relation:

$$\vec{S} = \vec{V} + \vec{W} \qquad (1)$$

To determine the components of the mean wind, during the calibration flight, the flight configurations classed in sub-range 9 are used for, in this sub-range, measurement of the modulus V of the air speed is valid and component $V_Z$ is close to zero. It is assumed that the number of flight configurations classed in this sub-range is equal to n.

First of all, for each flight configuration of the sub-range 9, the three components $S_N$, $S_E$ and $S_V$ of the vector $\overline{S}$ in the Earth's reference frame are calculated from its components $S_X$, $S_Y$ and $S_Z$ measured in the helicopter reference frame. Such a transportation is made from formula for changing the reference frame which are well known to a man skilled in the art, which use the attitude angles $\psi$, $\theta$ and $\phi$. Thus, for each flight configuration of rank i, four scalar magnitudes are available which are:

the modulus $V_i$ of the vector $\overline{V}$, and
the three components $S_{Ni}$, $S_{Ei}$ and $S_{Vi}$ of vector S in the Earth's reference frame.

Now, the relation (1) may be written:

$$\vec{S} - \vec{W} = \vec{V} \qquad (2)$$

The relation (2) written in modulus and at time $t_i$, gives the equation:

$$(S_{Ni} - W_N)^2 + (S_{Ei} - W_E)^2 + (S_{Vi} - W_V)^2 = V_i^2 \qquad (3)$$

The equation (3) represents the fact that, in the Earth's reference frame, the end of vector $\overline{W}$ is situated on a sphere $SP_i$ centred at the point of coordinates ($S_{Ni}$, $S_{Ei}$ and $S_{Vi}$) and of radius $V_i$.

Thus, n equations are available such as the relation (3), each of them being relative to a different time of rank i.

If the equation relative to time $t_i$ is subtracted term b term from that relative to time $t_j$, we obtain the equation:

$$(S_{Nj} - W_N)^2 - (S_{Ni} - W_N)^2 + (S_{Ej} - W_E)^2 - (S_{Ei} - W_E)^2 + (S_{Vj} - W_V)^2 - (S_{Vi} - W_V)^2 = V_j^2 - V_i^2 \qquad (4)$$

which becomes $$2(S_{Ni}-S_{Nj})\,W_N + 2(S_{Ei}-S_{Ej})\,W_E + 2(S_{Vi}-S_{Vj})\,W_V = S^2_{Ni} - S^2_{Nj} + S^2_{Ei} - S^2_{Ei} - S^2_{Ei} - S^2_{Ej} + S^2_{Vi} - S^2_{Vj} + V^2_j - V^2_i \qquad (5)$$

Equation (5) represents the fact that, in the Earth's reference frame, the end of vector $\overline{W}$ is located on the radical plane of sphere $SP_i$ and of sphere $SP_j$, i.e. the plane which contains the circle at which these two spheres intersect, when they have at least one common point, which is as a general rule the case here.

By writing all the equations such as (5) for all the pairs i, j, i being different from j, a system of n (n−1)/2 equations with three unknowns $W_N$, $W_E$ and $W_V$ is obtained.

Then this system is resolved by the method of least squares for determining the three unknowns $W_N$, $W_E$ and $W_V$, which are the three components of the mean wind to be determined.

In the above method, it will be understood that it is the fact of solving the system of n(n−1)/2 equations by linear regression which introduces averaging over the components $W_N$, $W_E$ and $W_V$.

In fact, if we take an ideal theoretical situation, where the vector W is strictly constant and where the measurements of $V_i$, $S_{Ni}$, $S_{Ei}$ and $S_{Vi}$ are exact, three equations such as equation (5) are sufficient for determining $W_N$, $W_E$ and $W_V$. In this case, the three spheres defined by these three equations have a common point and only one, whose three coordinates are the three components sought. In this ideal case, multiplication of the measurement times allows other groups of three spheres to be formed whose common point is always the same.

However, in the practical cases where vector W varies slightly between two measurement times and where the measurements of $V_i$, $S_{Ni}$, $S_{Ei}$ and $S_{Vi}$ are erroneous, it will be understood that the n spheres of equation (5), properly speaking, no longer have a common point and that this common point in fact bursts into a cloud of points, a cloud which has a more or less wide volume inside which all the spheres pass.

In this case, the above method brings a solution of the problem raised by determination of the mean coordinates of this volume. In addition, passages through the equations (5) of the radical planes, and application of the method of least squares to the system of equations (5) leads to a result which is quite satisfactory, with respect to the accuracy of the result as also to the calculating time.

In the particular case where the component of the vertical wind is small, the method of the invention may be simplified so as to gain calculation time for solving the equation system. In fact, if the vertical wind is small, it may be assumed that the component $V_{Vi}$ along the vertical axis of the Earth's reference frame, of the proper speed V of the helicopter is equal to:

$$V_{Vi} = V_i \sin \theta_i \qquad (6)$$

in which expression $\theta_i$ is the yaw angle measured at the same time $t_i$ as the modulus $V_i$ of the proper speed $\vec{V}$.

The projection of the relation (2) on the vertical axis of the Earth's reference frame gives the equation:

$$S_{Vi} - W_{Vi} = V_i \sin \theta_i \qquad (7)$$

which immediately makes it possible to determine $W_{Vi}$ and the component $W_v$ as average of $W_{Vi}$, from the relation $$W_V = (1/i) \sum_{k=1}^{i} S_{Vk} - V_k \sin \theta_k \qquad (8)$$

The projection of relation (2) on the horizontal plane of the Earth's reference frame gives the equation:

$$(S_{Ni} - W_N)^2 + (S_{Ei} - W_E)^2 = V^2_i \cos^2 \theta_i \qquad (9)$$

The equation (9) represents the fact that, in the horizontal plane, the end of the projection of the vector $\overline{W}$ is situated on a circle $C_i$ centered at the point of coordinates $(S_{Ni}, S_{Ei})$ and radius $V_i \cos \theta_i$.

Thus, n equations such as the relation (9) are available.

If we subtract the equation relative to time $t_i$ term by term from that relative to time $t_j$, we obtain the equation:

$$(S_{Nj} - W_N)^2 - (S_{Ni} - W_N)^2 + (S_{Ej} - W_E)^2 - (S_{Ei} - W_E)^2 = V_j^2 \cos^2 \theta_j - V_i^2 \cos^2 \theta_i \qquad (10)$$

which becomes $$2(S_{Ni} - S_{Nj})W_N + 2(S_{Ej} - S_{Ej})W_E = S^2_{Ni} - S^2_{Nj} + S^2_{Ei} - S^2_{Ej} + V^2_j \cos^2 O_j - V^2_i \cos^2 \qquad (11)$$

The equation (11) represents the fact that, in the horizontal plane, the projection of the end of vector $\overline{W}$ is situated on the radical axis of circle $C_i$ and circle $C_j$, namely of the straight line which contains the two intersection points of these two circles.

Then, as before, a system of n (n−1)/2 equations is obtained, but with only two unknowns, $W_N$ and $W_E$, which system is resolved by the method of least squares.

When the components $W_N$, $W_E$ and $W_Z$ of the mean wind during the calibration flight have been determined from data relative to the flight configurations classed in sub-range 9, the components $W_{Xi}$ and $W_{Yi}$ of the mean wind are calculated in the reference frame OXYZ of the helicopter 1 for each of the n configurations classed in the whole of sub-ranges 1 to 12. For this, the known reference frame change formulae are used, with the measured values $\psi_i$, $\theta_i$ and $\phi_i$ of the attitude angles for each configuration. Application of the relation (2) in the reference frame OXYZ allows the estimated values $\hat{V}_{Xi}$ and $\hat{V}_{Yi}$ of the air speed to be determined by the formulae:

$$\left. \begin{array}{l} \hat{V}_{Xi} = S_{Xi} - W_{Xi} \\ \hat{V}_{Yi} = S_{Yi} - W_{Yi} \end{array} \right\} \qquad (12)$$

Then the second task of the second step of the method of the invention is begun, which relates to the formation of two correlation matrices, one relative to the estimated speed $\hat{V}_X$ and the other to the estimated speed $\hat{V}_Y$.

For this, first of all, for each of the N flight configurations, the values of a number of variables constructed from the pitches $P_O$, $P_X$, $P_Y$, $P_Z$, from the angles $\theta_X$ and $\theta_Y$ and from the acceleration $\gamma_Z$ are calculated. Here these constructed variables comprise:

five simple variables of the first order, namely $P_O$, $P_X$, $P_Y$, $P_Z$ and $\gamma_Z$, two combined variables of the first order, namely $P_X - \theta_X$ and $P_Y - \theta_Y$, and 28 simple variables of the second order, namely the squares and products two by two or the variables $P_O$, $P_X$, $P_Y$, $P_Z$, $\theta_X$, $\theta_Y$, $\gamma_Z$.

The 28 simple variables of the second order comprising all the squares $P_O^2$, $P_X^2$, ..... $\gamma_Z^2$ and all the products two by two $P_O P_X$, $P_O P_Y$ ..... $\theta_Y \gamma_Z$.

Then a first set, here of 36 variables is formed comprising the 35 preceding constructed variables and the estimated speed $\hat{V}_X$. These 36 variables each take M values, each of these M values being relative to one of the M flight configurations classed in sub-ranges 1 to 8 during the calibration flight. It is therefore possible to calculate, for each of the possible pairs of these 36 variables, a correlation coefficient which represents the fact that the variations of the values of each variable of the pair, out of the M flight configurations, are more or less correlated. The formula for calculating such a coefficient from the M different values of each variable is well known to a man skilled in the art. Since a usual way of presenting the results of these calculations is to form a table, here of 36 lines and 36 columns, to assign each of the 36 variables to each of the 36 lines and to each of the 36 columns, and to place the correlation coefficient of each pair at the intersection of the line and column corresponding to this pair, it is said that the matrix of the correlation coefficients or correlation matrix is calculated.

A second set is also formed comprising the 35 previously constructed variables and the estimated speed $\hat{V}_Y$ for which the correlation matrix is calculated. However, for the estimated speed $\hat{V}_Y$ for calculating the correlation matrix, the N flight configurations classed in the sub-ranges 1 to 12 are taken into account and not only M flight configurations classed in the sub-ranges 1 to 9. In fact, as has been mentioned, the sub-ranges 9 to 12 correspond to a modulus V of the air speed greater than the threshold $VV_S$, for example equal to 45 knots. Now, in this case, not only the measurement of this modulus is valid but in addition, the arrangement of the Pitot tube is such that we may assume that $$V_X \simeq V \qquad (13)$$

In practice the result is that, when modulus V is greater than the threshold $V_S$, $V_X$ is not determined by calculation but the result of the anemobarometric measurement is used. It is then pointless to take into account the data relative to the sub-ranges 9 to 12 for establishing the formulae for calculating the speed $V_X$, since, for comparable configurations occurring during normal flight, the formula for calculating $V_X$ will not be used. On the other hand, all the sub-ranges are taken into account for the speed $V_Y$, for this speed is always determined by calculation.

The two correlation matrices being thus constructed, during the third step the formulae are determined which will allow the components $V_X$ and $V_Y$ to be calculated in normal flight as a function of the magnitudes $P_O$, $P_X$, $P_Y$, $P_Z$, $\theta_X$, $\gamma_Y$, $\gamma_Z$.

For this, considering first of all the case of component $V_X$, the constructed variable the most correlated with the estimated speed $\hat{V}_X$ is determined first of all. For that, using the correlation matrix relative to $\hat{V}_X$, the constructed variable is determined whose correlation coefficient with $\hat{V}_X$ is the highest. As a general rule and as theory and experience confirm, this first most correlated variable proves to be the variable $(P_X - \theta_X)$. Then, from the estimated speed $\hat{V}_X$, the most correlated variable is subtracted, here $(P_X - \theta_X)$ multiplied by a multiplicative coefficient $a_1$ chosen so that the modified estimated speed is totally decorrelated from $(P_X - \theta_X)$. If we call $\hat{V}_{Xm}$ the modified estimated speed, we may write:

$$\hat{V}_{Xm} = \hat{V}_X - a_1 (P_X - \theta_X) \quad (14)$$

The value of coefficient a1 is related to that of the correlation coefficient and to the mean values of $\hat{V}_X$ and $(P_X - \theta_X)$ by a law well known to a man skilled in the art.

The error committed is also calculated by assuming that the modified value $\hat{V}_{Xm}$ is zero, i.e. that the estimated speed $V_X$ is equal to the product of the most correlated variable $(P_X - \theta_X)$ by the multiplicative coefficient $a_1$.

Then a modified correlation matrix is calculated, replacing the estimated speed $\hat{V}_X$ by the modified estimated speed $\hat{V}_{Xm}$. Then, the variable the most correlated with the modified estimated speed $\hat{V}_{Xm}$ or second most correlated variable with the speed $\hat{V}_X$, is determined. Let us suppose here that this variable is the variable $P_X P_Z$.

Then $P_X P_Z$, multiplied by a multiplicative coefficient $a_2$ is subtracted, so that the estimated variable modified a second time is totally decorrelated from the variable $P_X P_Z$. The variable modified a second time is then equal to $$\hat{V}_{Xm} - a_1 (P_X \theta_X) - a_2 P_X P_Z \quad (15)$$

The error committed is calculated by assuming that this modified value is zero, and so on.

This operation is repeated until a number $n_x$ of variables has been subtracted from the estimated speed $V_X$, which number is at most equal to 15 and sufficient for the error committed to be less than a given threshold.

Assuming that the error is zero, a formula is then available which makes it possible to calculate the estimated speed $\hat{V}_X$ as function of the $n_X$ most correlated variables, namely as a function of $P_O$, $P_X$, $P_Y$, $P_Z$, $\theta_X$, $\theta_Y$, $\gamma_Z$.

For one type of helicopter, this calculation formula may be of the form:

$$\hat{V}_X = a_1 (P_X - \theta_X) + a_2 P_X P_Z + \ldots + a_{nx} \gamma_Z^2 \quad (16)$$

whereas for another type, it may be of the form:

$$\hat{V}_X = a'_1 (P_X - \theta_X) + a'_2 P_X^2 \ldots + a'_{nx} P_Y \theta_Z \quad (16')$$

and so on.

It will be noted that the above defined algorithm is that known under the name of stepwise regression.

By applying the same algorithm to the correlation matrix relative to the estimated speed $\hat{V}_Y$, we obtain a similar formula, for example of the form:

$$V_Y = b_1 (P_Y - \theta_Y) + b_2 P_Y \theta_X + \ldots + b_{ny} P_Z^2 \quad (17)$$

or else of the form:

$$\hat{V}_Y = b'_1 (P_Y - \theta_Y) + b'_2 \theta_X^2 + \ldots + b'_{ny} P_Y P_Z \quad (17')$$

Then, the formulae (16) and (17) are used or, as required, formulae (16') and (17') for calculating, during the fourth and last step of the method of the invention, the values of the speeds $V_X$ and $V_Y$ as a function of the values of $P_O$, $P_X$, $P_Y$, $P_Z$, $\theta_X$, $\theta_Y$, $\gamma_Z$ measured permanently during normal flight, and for displaying the calculated values $V_X$ and $V_Y$ for use by the pilot of the helicopter 1.

However, although the method which has just been described is very efficient for determining the form, or structure of calculation formulae, it may in some cases lead to numerical values of the multiplicative coefficient such as $a_i$ and $b_i$ which lack precision.

By structure of the calculation formulae should be understood here the number and nature of the constructed variables which they use, independently of the numerical values of the multiplicative coefficients affecting these variables in the formulae. For example, the formulae (16) and (16') are of different structures to the extent that the variable $P_Y \theta_X$ appears in formula (16) and not in formula (16').

To obtain more precise values for the multiplicative coefficients $a_i$ and $b_i$, the method of the invention then uses, by way of improvement, the calculation formulae whose structure is determined as has been described, but in which the values of the multiplicative coefficients $a_i$ and $b_i$ may be calculated independently more accurately so as to correct their values previously obtained.

For this, at the end of the third step, when the structure of each of the two calculation formulae is known, it is possible to consider the multiplicative coefficients $a_i$ and $b_i$ as unknowns. By transferring to the formula giving $V_X$, and for each of the M flight configurations belonging to the sub-ranges 1 to 8, the results of the measurements relative to $P_O$, $P_X$, $P_Y$, $P_Z$, $\theta_X$, $\theta_Y$, $\gamma_Z$ made during the first step, and by identifying the quantity thus obtained at speed $\hat{V}_X$, estimated during the second step, a system of M linear equations is obtained in which the $n_X$ unknowns are the multiplicative coefficients $a_i$. Resolution of this system by the method of least squares makes it possible to determine the values of coefficients $a_i$ with good accuracy. Then the values of these coefficients are corrected in the formula for calculating $V_X$ during normal flight, by replacing their old values by those thus determined.

The procedure is the same for determining the coefficients $b_i$ appearing in the formula for calculating $V_Y$, this time considering the set of N flight configurations of the sub-ranges 1 to 12.

In a first variant of the method of the invention, it is possible to improve the calculation of the multiplicative coefficients $a_i$ and $b_i$, without having to assume that the wind remains constant during the whole of the calibration flight, which assumption is necessary for estimating the speeds $V_X$ and $V_Y$ in each flight configuration of the calibration flight.

In this first variant, from the M flight configurations of ranges 1 to 8, pairs of flight configurations are chosen having dating times sufficiently close to assume that the wind has remained the same between these two configurations.

For this, after fixing a maximum time interval between two configurations, short of which time interval it may be assumed that the wind has remained the same, we start for example from the last classed flight configuration and go back systematically over the succession of classed flight configurations, by forming pairs both belonging to the sub-ranges 1 to 8, separated by a time interval less that the maximum admitted time interval. In order to avoid having to take the same flight configuration several times in different pairs, every configuration taken in in a pair is marked.

For each of the two configurations of each pair, for example the configuration of rank k and that of rank l, the results $\bar{S}_k$ and $\bar{S}_l$ of the measurements of the speed of the helicopter with respect to the ground are transposed into the Earth's reference frame, using the known reference frame change formulae.

Similarly, the results of $\vec{V}_k$ and $\vec{V}_l$ given by the formulae for calculating the air speed are transposed into the Earth's reference frame.

Since the wind is assumed constant between the two configurations we may write, in the Earth's reference frame:

$$\vec{S}_k - \vec{S}_l = \vec{V}_k - \vec{V}_l \tag{18}$$

Formula (18) represents the fact that the measured variation of the ground speed of the helicopter between the two configurations of rank i and j is equal to the variation calculated using formulae for calculating the air speed of the helicopter 1, since it is assumed that the wind has not varied between these two configurations.

The transfer, into equation (18), of the measured results in each flight configuration, the coefficients $a_i$ and $b_i$ being considered as unknowns, makes it possible to form a linear equation for each pair of configurations. Resolution of the system of linear equations thus obtained by the method of least squares makes it possible to determine the coefficients $a_i$ and $b_i$ and so simultaneously identify the formulae for calculating $V_X$ and $V_Y$ over the sub-ranges 1 to 8.

To take into account the points of sub-ranges 9 to 12 for identifying the formula for calculating $V_Y$, a similar procedure may be used over the whole of ranges 1 to 12, taking as speed $V_X$ that given by the calculation formula for the points of sub-ranges 1 to 8 and that measured by the anemobarometric sensor for the points of sub-ranges 9 to 12.

In a second variant, instead of forming pairs of points, it may be assumed that the wind follows a polynomial law, in the Earth's reference frame, as a function of time, with unknown coefficients, namely for example assuming that the vertical component of the wind is zero:

$$\left. \begin{array}{l} W_N = \sum_{i=0}^{m} \alpha_i t_i \\ W_E = \sum_{i=0}^{m} \beta_i t_i \end{array} \right\} \tag{19}$$

By transposing the speed $\vec{W}$ in the helicopter's reference frame OXYZ, for each classed flight configuration, a linear equation is then obtained by identifying the result of the measurement of the speed $\vec{S}$ with respect to the ground with the sum of the wind speed, derived from relations (19), and of the air speed, obtained by the calculation formulae. Thus, the relation (1) is simply applied:

$$\vec{S} = \vec{W} + \vec{V} \tag{1}$$

Thus a system of linear equations is obtained whose unknowns are the coefficients $a_i$, $b_i$, as well as the unknown coefficients $\alpha_i$ and $\beta_i$ of the polynomial law of the wind.

Naturally, simplifications are possible if the calibration flight occurs in a plane parallel to the ground, for the formulae for passing from the Earth's reference frame to the helicopter's reference frame and conversely now depend only on the heading angle $\psi$.

Similarly, when the structures of the calculation formulae have been determined and when it is desired simply to again determine the multiplicative coefficients $a_i$ and $b_i$, it is possible to make a simplified calibration flight.

As has been mentioned, in response to the results of the measurement of modulus V of the air speed made by the anemobarometric sensor, as value of the air speed $V_X$, the result of the measurement is selected if it is greater than threshold $V_S$, or that of calculation by the calculation formula, if the result of the measurement is less than the threshold $V_S$, or else a combination of the two, in the intermediate cases. These correspond here to the sub-range 4, called for this reason hybridation sub-range.

Figure 2:
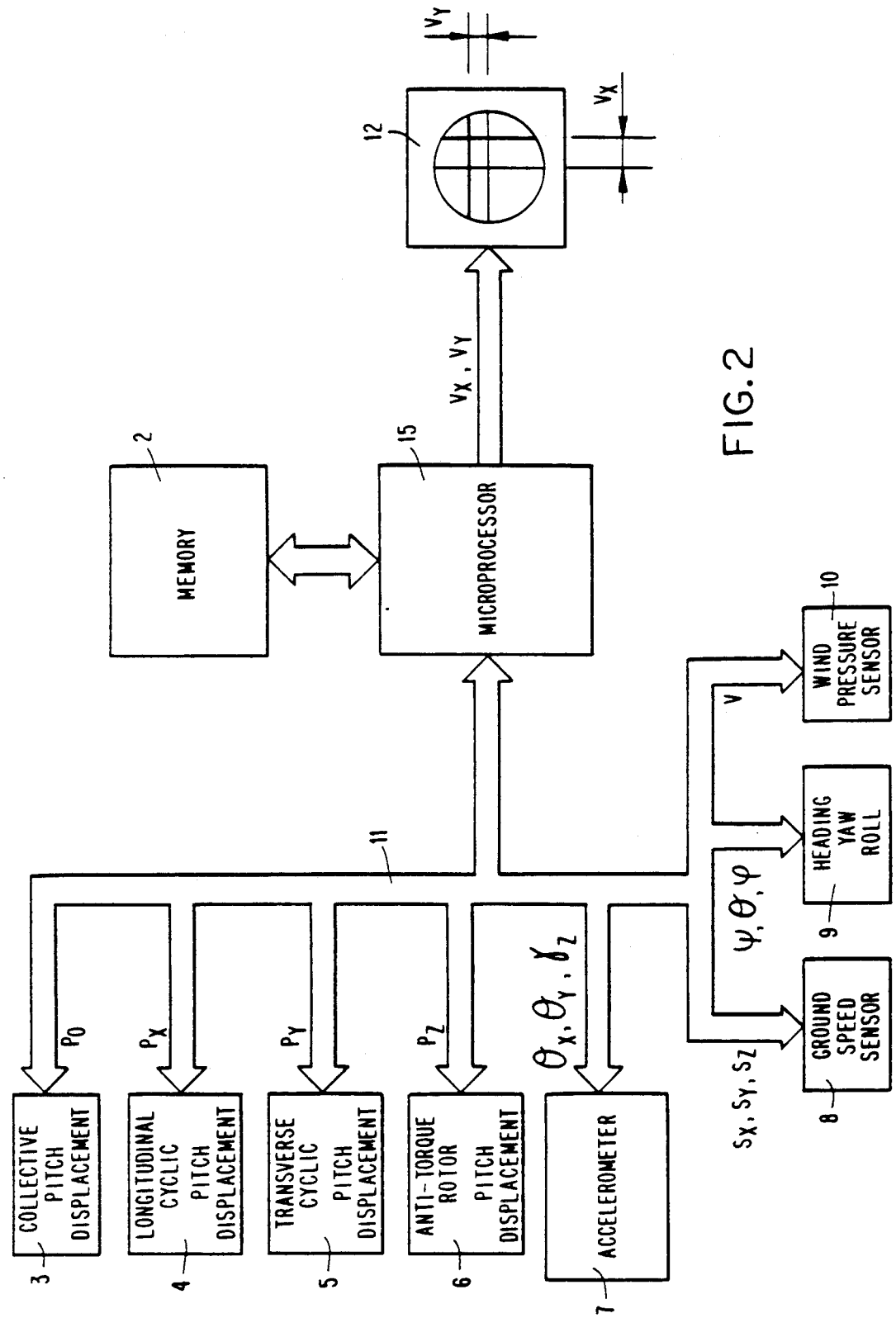
FIG. 2 shows a block diagram of the device of the invention, carried on board the helicopter of FIG. 1.

The method of the invention is put into practice by means of the device which will now be described with reference to FIG. 2.

The main element of the device is a microprocessor 15, here of the type commercialized by the firm INTEL under the reference 8086, having a memory circuit 2.

The memory circuit 2 comprises a ROM type memory of 64 kbytes, in which the program for controlling the microprocessor is stored, a memory of RAM type of 16 k bytes and a memory of EEPROM type of 16 kbytes, these last two memories being provided for storing the data handled by microprocessor 15.

Microprocessor 15 is connected by a bus 11 to the on board instruments of the helicopter 1. These instruments comprise four displacement sensors 3, 4, 5 and 6, mounted on the collective pitch, longitudinal and transverse pitch controls as well as the control of the pitch of the anti-torque rotor, which deliver the magnitudes $P_O$, $P_X$, $P_Y$, $P_Z$ in digital form, respectively.

The on board instruments also comprise an accelerometric device 7 of known type which measures the three accelerations $\gamma_X$, $\gamma_Y$ and $\gamma_Z$ of helicopter 1 along axes OX, OY and OZ. The accelerometric device 7 is here provided with a computing unit which computes the bank angles $\theta X$ and $\theta Y$ from the known formulae:

$$\theta_X = \gamma_X / \gamma_Z \tag{20}$$

and $$\theta_Y = \gamma_Y / \gamma_Z \tag{21}$$

If these angles were not computed in the accelerometric device 7, they could be measured by known type inclinometers.

The accelerometric unit 7 delivers the magnitudes $\theta_X$, $\theta_Y$ and $\gamma_Z$ in digital form.

The on board instruments also comprise a device 8 for measuring the three components $S_X$, $S_Y$ and $S_Z$ of the ground speed, in the reference frame OXYZ. Such a device, which comprises for example a Doppler radar, delivers the magnitudes $S_X$, $S_Y$ and $S_Z$ in digital form.

An attitude unit 9 is also provided which measures the heading $\psi$, yaw $\theta$ and roll $\phi$ angles of the helicopter 1, and delivers them in in digital form. Finally an anemobarometric sensor 10 measures the modulus V of the air speed and delivers this magnitude in digital form.

Furthermore, a stationary flight indicator 12 is provided, of known type with crossed needles, which allows the pilot to know the air speed of components $V_X$ and $V_Y$ calculated by the microprocessor 15. Such an indicator comprises two perpendicular needles which are movable in translation perpendicularly to their respective longitudinal directions. The first one is driven with a displacement proportional to component $V_X$ and the second with a displacement proportional to component $V_Y$. When the components $V_X$ and $V_Y$ are zero, the needles are crossed in the centre of the dial. When the components $V_X$ and $V_Y$ are not zero, they are crossed at a point which moves away from the centre of the dial in a way representing the vector of components $V_X$ and $V_Y$.

The program which controls the microprocessor 15 is stored in memory 2. It is provided so that microprocessor 15 carries out all the tasks which have just been mentioned and delivers to indicator 11 the data $V_X$ and $V_Y$ in normal flight, calculated from the calculation formulae determined after the calibration flight.

Programming of the microprocessor 15 so that it carries out the tasks described is obviously within the scope of a man skilled in the art and will not be described further here.

By way of example, for a number N of points of the order of 300, the calculating time required for determining the structure of the calculation formulae and for determining the values of their multiplicative coefficients is about 20 to 40 minutes.

When, as has been described, microprocessor 15 controls the on board instruments for providing a set of parameters every 250 milliseconds, the duration of the calibration flight is about 1 hour, still assuming that a number N of correlation configurations of about 300 is provided.

What is claimed is:

1. Method for determining the speed of a helicopter with respect to the air for piloting same, which helicopter has a longitudinal axis OX a transverse axis OY and a vertical axis OZ, with a lift rotor whose collective pitch $P_O$, longitudinal cyclic pitch $P_X$ and transverse cyclic pitch $P_Y$ are controllable, as well as an antitorque rotor whose pitch $P_Z$ is controllable, in which method the two components $V_X$ and $V_Y$ of this speed along the two axes OX, OY are determined, respectively, as a function of the controlled values of said pitches $P_O$, $P_X$, $P_Y$ and $P_Z$, of the angles of bank $\theta_X$, $\theta_Y$ of the helicopter about axes OY and OX respectively, and of the acceleration value $\gamma_z$ of the helicopter along axis OZ, wherein:

during a first step, a calibration flight is made, causing the helicopter to pass through a plurality of N different flight configurations, for each of which both a plurality of magnitudes for estimating the speeds $V_X$ and $V_y$ and the values of the pitches $P_O$, $P_X$, $P_Y$ and $P_Z$, of the angles $\theta_X$, $\theta_Y$ and of the acceleration $\gamma_Z$ are measured, during a second step, said speeds $V_X$ and $V_Y$ are estimated for each flight configuration, a first matrix is calculated of the correlation coefficients of all the possible pairs of variables of a first set of variables comprising the estimated speed $\hat{V}_X$ and variables constructed from the pitches $P_O$, $P_X$, $P_Y$ and $P_Z$, from angles $\theta_X$, $\theta_Y$ and from the acceleration $\gamma_Z$, and a second matrix is calculated comparably with the first one but relative to a second set of variables comprising the estimated speed $\hat{V}_Y$ and said constructed variables, during a third step, using said first matrix, the constructed variable of the first set the most correlated with the estimated speed $\hat{V}_X$ is determined, from this estimated speed $\hat{V}_X$ is subtracted said most correlated constructed variable multiplied by a multiplicative coefficient chosen so that the estimated speed thus modified is totally decorrelated from the most correlated constructed variable, the error committed is calculated by admitting that the modified value is zero, a first modified matrix is calculated like said first matrix was calculated but replacing the estimated speed $\hat{V}_X$ by the modified estimated speed, and the operation is repeated until a number $n_x$ of constructed variables of the first set have been subtracted from the estimated speed $\hat{V}_X$, sufficient so that the error committed, assuming that the modified value is zero, is less than a threshold, so as to obtain, for the value of the estimated speed $\hat{V}_X$, a calculation formula as a function of the $n_x$ constructed variables of the first set, and the procedure is the same for the second matrix, so as to obtain a similar calculation formula for $\hat{V}_Y$ as a function of $n_y$ constructed variables of the second set, and during a fourth step, in normal flight, the values of the pitches $P_O$, $P_X$, $P_Y$ and $P_Z$, of the angles $\theta_x$, $\theta_y$ and of the acceleration $\gamma_Z$ are measured, the speeds $V_X$ and $V_Y$ are calculated by applying the calculation formulae defined during the third step and in response to the values measured during the fourth step, and the calculated values $V_X$ and $V_Y$ are displayed for use by the pilot of the helicopter.

2. The method as claimed in claim 1, wherein the variables constructed during the second step from pitches $P_O$, $P_X$, $P_Y$ and $P_z$, angles $\theta_x$, $\theta_y$ and acceleration $\gamma_z$ comprise:

simple variables of the first order, namely $P_O$, $P_X$, $P_Y$ and $P_Z$ and $\gamma_Z$, combined variables of the first order namely $P_X - \theta_X$ and $P_Y - \theta_Y$ and simple variables of the second order, namely the squares and the two by two products of the variables $P_O$, $P_X$, $P_Y$, $P_Z$, $\theta_X$, $\theta_Y$ and $\gamma_Z$.

3. The method as claimed in claim 1, wherein, at the end of the third step, the $n_x$ and $n_y$ multiplicative coefficients of the formulae for calculating $V_X$ and $V_Y$, respectively, are considered as unknowns, the results of the measurements made during the first step are brought forward into these formulae, so as to form at least one system of linear equations in which the $n_x$ and $n_y$ multiplicative coefficients are the unknowns, this system is solved and, in the formula for calculating $V_X$ and $V_Y$, the values of the $n_x$ and $n_y$ multiplicative coefficients, respectively, are corrected by replacing them by those thus defined.

4. The method as claimed in claim 3, wherein the system of linear equations is solved by the method of least squares.

5. The method as claimed in claim 3, wherein first and second linear equation systems are formed by identifying, for a plurality of flight configurations taken from the N flight configurations, the estimated speed $\hat{V}_X$ or $\hat{V}_Y$ obtained during the second step, with the quantity obtained by the corresponding calculation formula.

6. The method as claimed in claim 3, wherein, during the first step, the ground speed is measured as well as the attitude angles of the helicopter for each of the flight configurations and the time of dating same, and, for forming the system of linear equations, from the flight configurations pairs of flight configurations are chosen having dating times sufficiently close to assume that the wind is the same in these two flight configurations, the result of the measurement of the ground speed and the formula for calculating the components of the air speed are transposed in the Earth's reference frame and for each flight configuration, and as equation to be solved those are taken which are obtained by identifying the measured variation of the ground speed of the helicopter between the two configurations of a pair, and the variation calculated by means of the formulae for calculating the air speed of the helicopter.

7. The method as claimed in claim 3, wherein, during the first step the ground speed and the attitude angles of the helicopter are measured for each of the flight configurations, as well as the time of dating same and, to form the system of linear equations, it is assumed that the wind, in the Earth's reference frame, follows a polynomial law as a function of time of unknown coefficients, the wind speed is transposed into the helicopter reference frame for each flight configuration, and, for a plurality of flight configurations taken from the N flight configurations, the result of the measurement of the ground speed is identified with the sum of the wind speed and the air speed obtained by the formulae for calculating $V_X$ and $V_Y$, so as to define at the same time the $n_x$ and $n_y$ multiplicative coefficients and the unknown coefficients of the polynomial law of the wind.

8. The method as claimed in claim 1 wherein, during the first step, the N different flight configurations are determined so that a minimum number of them belongs to each of the sub-ranges of the range of possible configurations of the helicopter in normal flight, each sub-range being defined for example by ranges of values of the magnitudes measured for each flight configuration.

9. The method as claimed in claim 8, wherein, during the first step, the modulus of the air speed of the helicopter is measured using anemobarometric means and each sub-range is also defined by ranges for the anemobarometric speed thus measured.

10. The method as claimed in claim 8, wherein the N flight configurations are determined so that the difference between any two of them belonging to the same rub-range is greater than a threshold.

11. The method as claimed in claim 1, wherein, during the first step, the ground speed and the attitude angles of the helicopter are measured as well as the modulus of the air speed of the helicopter, it is assumed that the mean wind in the Earth's reference frame has remained constant during the calibration flight, a plurality of equations is formed, each equation identifying, for a flight configuration in the Earth's reference frame, the measured modulus of the air speed and the calculated modulus of the difference between the ground speed and the wind speed, these equations are subtracted term by term and two by two, the system of equations thus formed is solved for correlating the mean wind speed during the calibration flight and, during the second step, the mean wind speed thus calculated is transposed in the helicopter's reference frame so as to estimate the air speed as the sum of the ground speed and the mean wind speed.

12. The method as claimed in claim 1, wherein, during the fourth step in normal flight, the air speed of the helicopter is measured using anemobarometric means, and in response to the value of the anemobarometric speed thus measured, as value of the air speed is selected the result of the measurement, that of the calculation by the calculation formulae determined during the third step, or a combination of both.

13. Device for determining the speed of a helicopter with respect to the air for piloting same, which helicopter has a longitudinal axis OX, a transverse axis OY and a vertical axis OZ, with a lift rotor whose collective pitch $P_O$, longitudinal cyclic pitch $P_X$ and transverse cyclic pitch $P_Y$ are controllable, as well as an anti-torque rotor whose pitch $P_Z$ is controllable, in which method the two components $V_X$ and $V_Y$ of this speed along the two axes OX, OY are determined, respectively, as a function of the controlled values of said pitches $P_O$, $P_X$, $P_Y$ and $P_Z$, of the angles of bank $\theta_X$, $\theta_Y$ of the helicopter about axes OY and OX respectively, and of the acceleration value $\gamma_z$ of the helicopter along axis OZ, comprising means for measuring, during a first step during which a calibration flight is made causing the helicopter to pass through a plurality of N different flight configurations, both a plurality of magnitudes for estimating the speeds $V_X$ and $V_y$, and the values of the pitches $P_O$, $P_X$, $P_Y$ and $P_Z$, angles $\theta_X$, $\theta_Y$ and acceleration $\gamma_Z$, means for estimating, during a second step, said speeds $V_X$ and $V_Y$ for each flight configuration, for calculating a first matrix of the correlation coefficients of all the possible pairs of variables of a first set of variables comprising the estimated speed $\hat{V}_X$ and variables constructed from pitches $P_O$, $P_X$, $P_Y$ and $P_Z$, angles $\theta_x$, $\theta_y$ and acceleration $\gamma_Z$, and for calculating a second matrix comparably to the first but relative to a second set of variables comprising the estimated speed $\hat{V}_Y$ and said constructed variables, means for determining, during a third step, and using said first matrix, the constructed variable of the first set the most correlated with the estimated speed $\hat{V}_X$, for subtracting from this estimated speed $\hat{V}_X$ said most correlated constructed variable multiplied by a multiplicative coefficient chosen so that the estimated speed thus modified is totally decorrelated from said constructed variable most correlated variable, for calculating the error committed while assuming that the modified value is zero, for calculating a first modified matrix as said first matrix was calculated but replacing the estimated speed $\hat{V}_X$ by the modified estimated speed, and repeating the operation until a number $n_x$ of constructed variables the first set are subtracted from the estimated speed $\hat{V}_X$ which are sufficient for the committed error, assuming that the modified value is zero, is less than a threshold, so as to obtain a calculation formula for the value of the estimated speed $\hat{V}_X$, as a function of the $n_x$ constructed variables of the first set, and to carry out a similar procedure for the second matrix so as to obtain a similar calculation formula for $\hat{V}_Y$, as a function of $n_y$ constructed variables of the second set, and means for measuring, during a fourth step, in normal flight, values of the pitches $P_O$, $P_X$, $P_Y$, $P_Z$, angles $\theta_x$, $\theta_Y$ and the acceleration $\gamma_Z$, means for calculating the speeds $V_X$ and $V_Y$ by means of the calculation formulae defined during the third step and in response to the values measured during the fourth step, and means for displaying the calculated values $V_X$ and $V_Y$ for use by the pilot of the helicopter.

* * * * *

UNITED STATES PATENT AND TRADEMARK OFFICE
CERTIFICATE OF CORRECTION

PATENT NO. : 5,063,777
DATED : November 12, 1991
INVENTOR(S) : Jean-Pierre ARETHENS et al.

It is certified that error appears in the above-identified patent and that said Letters Patent is hereby corrected as shown below:

On the Title page, item [75]

Please correct the spelling of the second listed inventor's name as follows:

P. Gouhier-Beraud

Signed and Sealed this

Twenty-eighth Day of September, 1993

Attest:

BRUCE LEHMAN

Attesting Officer

Commissioner of Patents and Trademarks